United States Patent

[11] 3,553,426

| [72] | Inventor | Aaron J. Fink<br>614 Springer Terrace, Los Altos, Calif. 94022 |
|---|---|---|
| [21] | Appl. No. | 715,223 |
| [22] | Filed | Mar. 22, 1968 |
| [45] | Patented | Jan. 5, 1971 |

[54] TEMPERATURE CONTROL APPARATUS
7 Claims, 4 Drawing Figs.

[52] U.S. Cl............................................................. 219/406,
219/210, 219/218, 219/390, 219/402; 119/37
236/3; 237/3
[51] Int. Cl.........................................................A01k 41/02;
F27d 11/02
[50] Field of Search............................................ 219/385,
390, 428, 406-7, 210, 218, 394, 478; 292/257;
263/37, 41; 119/37, 35; 236/3, 2; 237/3, 14

[56] References Cited
UNITED STATES PATENTS

| 1,979,222 | 10/1934 | Goodwin | 219/218 |
| 2,584,435 | 2/1952 | Doerr | 219/218X |
| 2,775,430 | 12/1956 | Norberg | 219/218X |
| 3,237,599 | 3/1966 | Torrey et al. | 119/37X |
| 3,376,405 | 4/1968 | Gower III | 119/37X |
| 1,127,021 | 2/1915 | Klett | 219/407 |
| 1,379,162 | 5/1921 | Brown | 292/257X |
| 1,831,151 | 11/1931 | Walker | 219/210 |
| 1,930,836 | 10/1933 | D'Amico | 219/390 |
| 1,967,185 | 7/1934 | Clapp | 219/210X |
| 2,253,971 | 8/1941 | Dodge | 219/385X |
| 2,857,074 | 10/1958 | Hutterer | 292/257X |
| 3,172,994 | 3/1965 | Peay et al. | 219/406X |
| 3,176,118 | 3/1965 | Scott | 219/394 |
| 3,412,234 | 11/1968 | Otavka | 219/406 |

FOREIGN PATENTS

| 1,362,218 | 4/1964 | France | 219/406 |

Primary Examiner—Volodymyr Y. Mayewsky

ABSTRACT: A temperature control apparatus incorporates separate compartments, adapted to be isolated from each other, but subject to the same constant temperature.

INVENTOR
AARON J FINK

TEMPERATURE CONTROL APPARATUS

BACKGROUND OF THE INVENTION

FIELD OF THE INVENTION

This invention relates to a temperature control apparatus, and in particular to a novel and improved incubation device.

DESCRIPTION OF THE PRIOR ART

Constant temperature devices are desirable for many applications. For example, when growing bacterial colonies or cultures for analyses and determination of the presence of infection and disease, the accuracy of the analysis depends partially on the temperature in which the culture is developed. Thus, incubators have been designed to provide the desired temperature control necessary for this purpose.

However, in presently known incubators, the heating element is generally disposed in one localized area, such as the bottom of the apparatus, whereby the heat energy rises and encompasses the culture plate or test device. Apparently, localized heating in an apparatus causes a temperature differential to be established, i.e., a different temperature at the bottom than at the top of the incubator. a thermometer which is positioned at one point in the incubator will read a temperature at that location, but will not reflect the exact temperature at various levels of the incubator. It has been observed that there may be a difference of several degrees in the temperature from bottom to top of an incubator, and the larger the vertical dimension, the greater such difference will be. If an erroneous temperature reading is obtained, then the analysis and interpretation of measured bacterial growth may not be valid.

Also, presently known incubation devices have only a single compartment containing a single atmosphere. In the art of bacterial culture growth, it is often necessary to subject the sample to be tested to a sequence of tests in an incubator. For example, some bacteria are adapted to grow in a carbon dioxide environment and not in a aerobic surrounding. Therefore, if a test is air proves negative, the medical practitioner may then repeat a growth test on the sample in an atmosphere of carbon dioxide enrichment. these tests are performed sequentially, and are time consuming and expensive.

It would be highly beneficial to the practitioner and to the patient if a rapid identification could be made of the type of bacteria that is present in a sample, so that infection and its treatment may be determined at an early time.

SUMMARY OF THE INVENTION

An object of this invention is to provide a novel and improved temperature control device.

Another object of this invention is to provide an incubation apparatus that provides a substantially constant temperature over its total incubation area.

Another object is to provide an incubation apparatus wherein different or similar culture growths may take place simultaneously in a varied gaseous environment, yet while at the same controlled temperature.

According to this invention, a temperature control device, particularly useful for incubation purposes, comprises a housing encompassed by a heating element that substantially encircles the incubation areas. Separate compartments are provided, such that different atmospheres may be introduced into one compartment without affecting the atmosphere of the other compartment or compartments. An additional feature is the provision of a thermostat that serves to maintain the overall temperature constant, after the initial warmup interval.

DESCRIPTION OF THE DRAWING

The invention will be described in greater detail with reference to the drawings in which.

Similar numerals refer to similar elements throughout the drawing.

DETAILED DESCRIPTION OF PREFERRED EMBODIMENT

Figure 1:
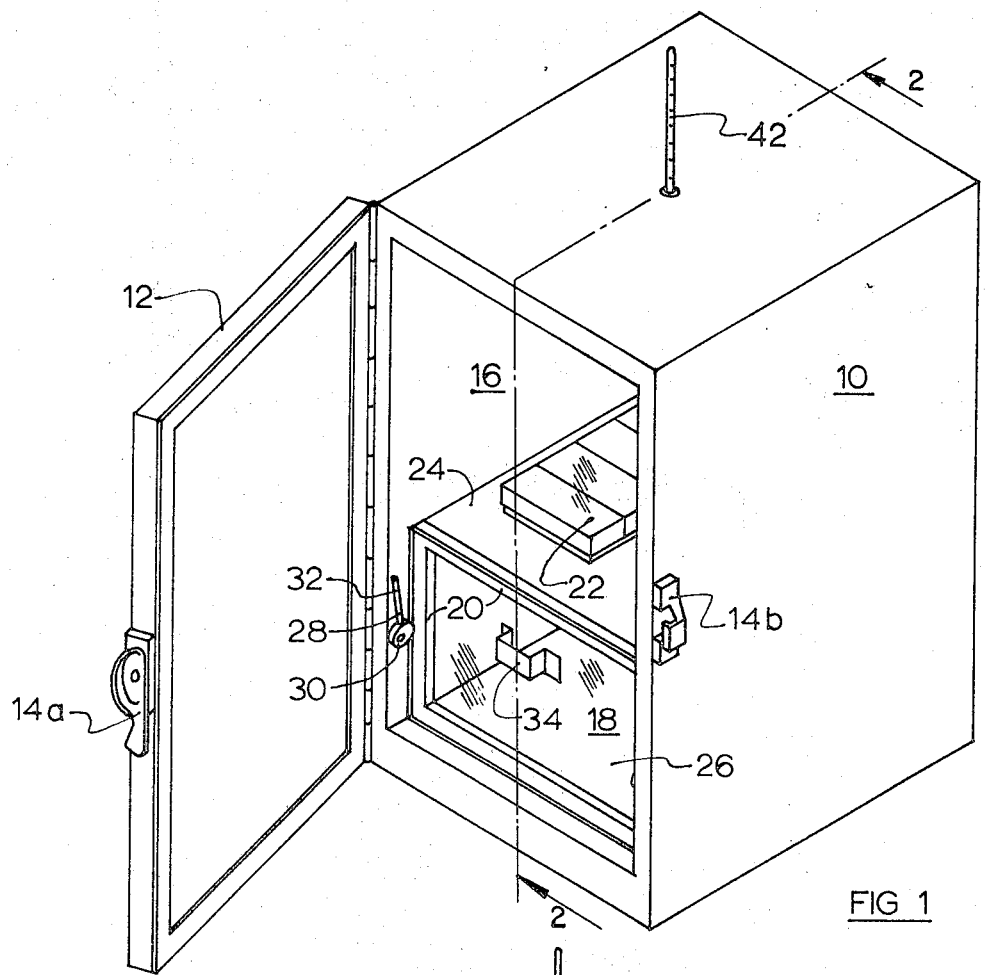
FIG. 1 is a perspective view of an incubation device, embodying the present invention.
Figure 2:
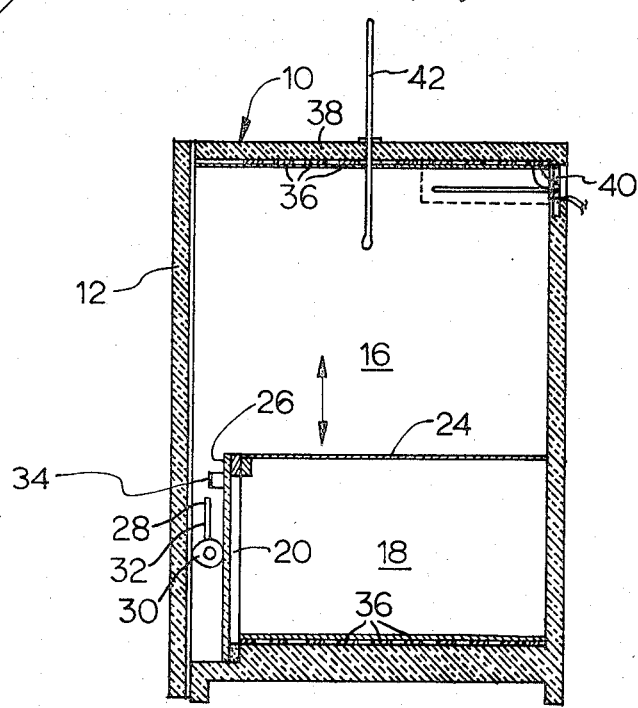
FIG. 2 is a side elevational view, in section, of the apparatus of FIG. 1.

With reference to FIG. 1, an incubation apparatus comprises a housing or enclosure 10, having a hinged door 12 providing access to a temperature controlled interior. When the door 12 is closed by means of a latch mechanism 14a and 14b, a substantially airtight enclosure is formed.

Two separate and independent compartments 16 and 18 are provided, each compartment being subject to the same controlled temperature. The compartment 18 is isolated from the compartment 16 by means of a wall structure 20. By way of illustration, a bacterial culture plate 22 is shown disposed on the top wall 24 of the structure 20 within the confines of compartment 16. To enable maintaining a separate atmosphere or environment in the compartment 18, a removable transparent door or cover 26, made of plastic or plexiglass with a rubber seal frame for example, is positioned to seal the opening of the chamber or compartment 18, so as to provide an airtight contained environment. To maintain a tight fitting seal, a locking mechanism 28, consisting of an eccentric cam 30 and lever 32, is employed to hold the transparent door 26 in a fixed, rigid position against the periphery of the wall structure 20 of the compartment 18. A handle 34 facilitates positioning of the transparent door 26.

Figure 4:
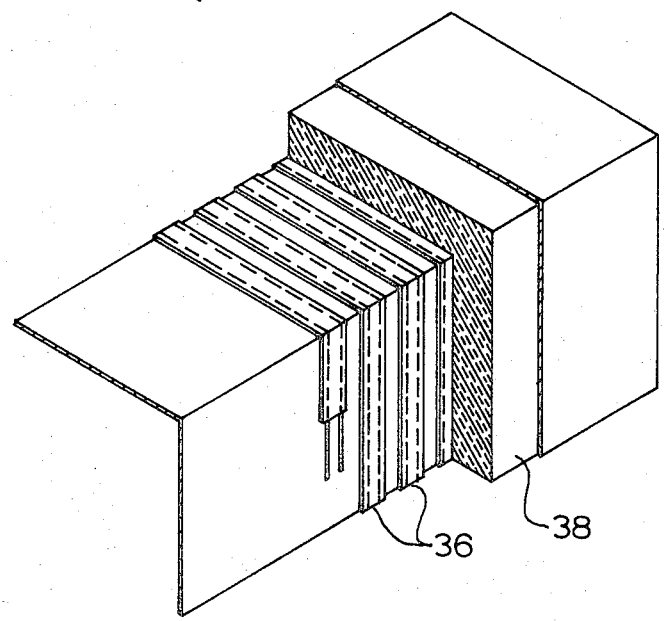
FIG. 4 is a breakaway view of an inner section of the incubation apparatus, depicting the arrangement of the heating element employed.

As shown in FIG. 4, within the spaced walls forming the housing 10, a continuous heating element 36 such as several turns of nichrome wire, is disposed against the inner housing wall. To ensure that the heat energy is not dissipated through the outer, external housing wall, insulation such as fiberglass 38 is placed around the heating element 36 so that the heat energy tends to flow into the incubation areas 16 and 18. Since the heating element 36 surrounds all four heat conducting walls of the incubation chamber constituted by compartments 16 and 18, as rapid temperature equilibrium is realized.

Figure 3:
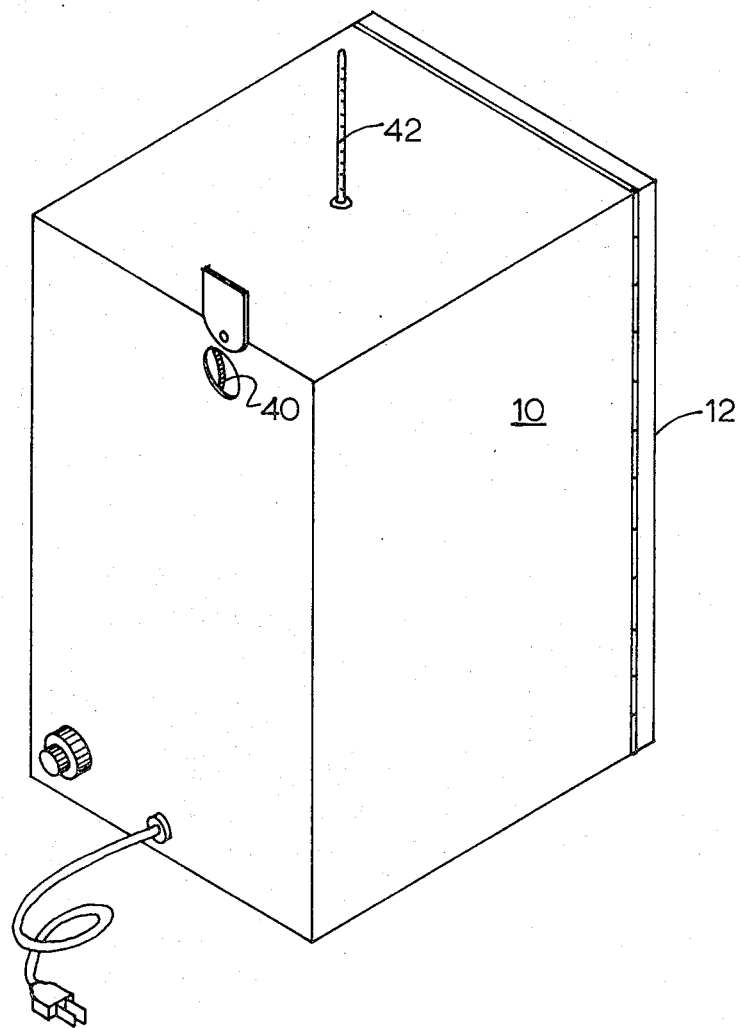
FIG. 3 is a rear perspective view of the novel incubation apparatus.

In practice, adjustment to obtain a selected temperature is made by means of a thermostat switch 40, located at the rear of the housing as shown in FIG. 3. A measure of the internal temperature within the incubation chamber is made by a thermometer 42 that is secured in an aperture on top of the incubator housing 10 by resilient O-ring type retainers. Within a very short interval of time after power is turned on to the heating coil 36, the temperature within the chamber is at equilibrium and at the temperature indicated by the thermostat 40. If the temperature is lower or higher than that desired, the thermostat 40 is easily adjusted. It has been found that the temperature within the incubation chamber can be held within a tolerance of one degree Fahrenheit over a wide temperature range.

With two compartments 16 and 18 having isolated atmospheres available, two bacterial cultures may be grown simultaneously at the same controlled temperature, but under different atmosphere conditions. For example, a test in a carbon dioxide ($CO_2$) atmosphere may be in order, while an aerobic test is in progress. The practitioner need only open the door 26 to the compartment 18, place a lighted candle within the compartment together with the sample under test, and secure the door 26 by means of the eccentric cam lock 28. In less than a couple of minutes, the oxygen content of the air in compartment 18 is reduced, and a required percentage of $CO_2$ atmosphere is supplied in a uniform diffusion throughout the chamber, without affecting the atmosphere of compartment 16.

The novel incubator configuration disclosed herein affords a compact structure providing a substantially uniform vertical, as well as horizontal, distributed temperature without hot spots. In the prior art incubation devices, a separate section with a heating supply is furnished, generally as a false bottom of the incubator, and heat energy distribution is effectuated by convection. Thus, a vertical temperature gradient is established, with a significant temperature difference between the top and bottom portions of the incubator. Also, such incubators utilized a single compartment having the possibility of only a single environment or atmosphere. Therefore, tests generally need to be conducted serially, and not in concurrence.

In a successful embodiment of this invention, an incubation device with independent compartments was made, having overall dimensions of 12 ×9½×14½inches, including 6 feet of nichrome wire, and operating with 40 watts power. By virtue of the compact design, temperature equilibrium is reached quickly, and the desired atmosphere may be established rapidly.

It should be understood that the scope of this invention is not limited to the particular combination described above. For example, the heating element may be crosswound to cover all the sidewalls as well as the top and bottom walls of the enclosure. A valve may be utilized to permit the introduction or exhaust of a selected gas to establish a suitable environment. More compartments may be provided, each isolated from each other, yet each subject to the same controlled temperature. Various modifications and additions may be made still within the spirit of this invention.

I claim:

1. A temperature control apparatus useful as an incubation device comprising:
   a housing formed with spaced walls, having an access door at its face providing an airtight enclosure when said door is closed;
   first and second compartments independently contained within said housing, disposed adjacent to each other, each compartment having separate wall structures, and a door for sealing said first compartment so that said first compartment provides an atmosphere separate and independent of that of said second compartment; and
   a continuous electrical heating element positioned between said spaced walls encompassing said compartments, said element having means for connection to an electrical power supply, and being electrically insulated from adjacent conductive walls, wherein said first compartment includes a separate wall structure within said housing, and a removable door for forming a sealed enclosure of said first compartment, including an eccentric cam locking means for urging said removable door against said separate wall structure, and for allowing removal of said door.

2. A temperature control device as in claim 1, wherein said removable door is transparent.

3. A temperature control apparatus useful as an incubation device comprising:
   a housing formed with spaced walls, having an access door at its face providing an airtight enclosure when said door is closed;
   first and second compartments independently contained within said housing, disposed adjacent to each other, each compartment having separate wall structures, and a door for sealing said first compartment so that said first compartment provides an atmosphere separate and independent of that of said second compartment; and
   a continuous electrical heating element positioned between said spaced walls encompassing said compartments, said element having means for connection to an electrical power supply, and being electrically insulated from adjacent conductive walls, for producing the same uniform temperature within both of said compartments.

4. A temperature control device as in claim 3, wherein said first compartment includes a separate wall structure within said housing, and a removable door for forming a sealed enclosure of said first compartment.

5. A temperature control device as in claim 3, wherein said heating element comprises several turns of nichrome wire.

6. A temperature control device as in claim 3, including a thermostat switch for setting the level of temperature to be maintained within said housing, said thermostat switch being electrically coupled to said heating element.

7. A temperature control device as in claim 3, including means formed in said housing for accommodating a temperature measuring instrument, so that the sensing portion of said instrument is within the housing enclosure, and the calibrated indicator of the instrument is external to the housing available for visual observation.